United States Patent [19]

Appel et al.

[11] 4,329,879
[45] May 18, 1982

[54] INSULATING LINER FOR ELECTROMAGNETIC FLOWMETER TUBE

[75] Inventors: Eggert Appel, Dransfeld; Wilfried Kiene, Hann-Muenden; Dieter Meier, Goettingen, all of Fed. Rep. of Germany

[73] Assignee: Fischer & Porter Co., Warminster, Pa.

[21] Appl. No.: 168,147

[22] Filed: Jul. 14, 1980

[51] Int. Cl.³ .............................................. G01F 1/58
[52] U.S. Cl. .................................. 73/861.12; 138/143
[58] Field of Search ........... 73/861.12, 861.11, 861.14, 73/861.16, 861.17; 138/174, 143

[56] References Cited

U.S. PATENT DOCUMENTS 3,213,685 10/1965 Mannherz et al. ............... 73/861.16
3,349,806 10/1967 Roberts ........................... 138/174 X
4,253,340 3/1981 Schmoock ...................... 73/861.12

FOREIGN PATENT DOCUMENTS 53-1295914 12/1978 Japan .

Primary Examiner—Charles A. Ruehl
Attorney, Agent, or Firm—Michael Ebert

[57] ABSTRACT

An electromagnetic flowmeter which includes a flow tube through which the fluid to be metered is conducted, the fluid intercepting a magnetic field to induce a voltage therein which is transferred to a pair of electrodes mounted at diametrically opposed positions on the tube. The inside surface of the meter tube is protectively lined with a stable liner assembly constituted by a three-dimensional stiffening structure embedded in an insulating layer which conforms to the surface.

4 Claims, 5 Drawing Figures

U.S. Patent May 18, 1982 4,329,879
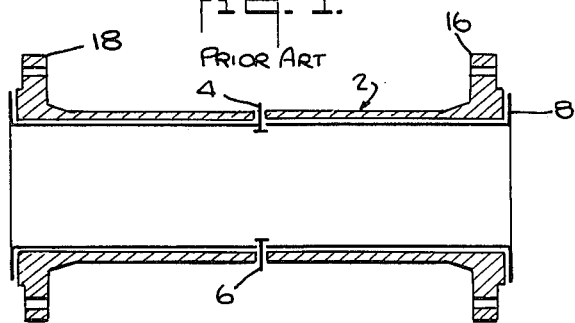
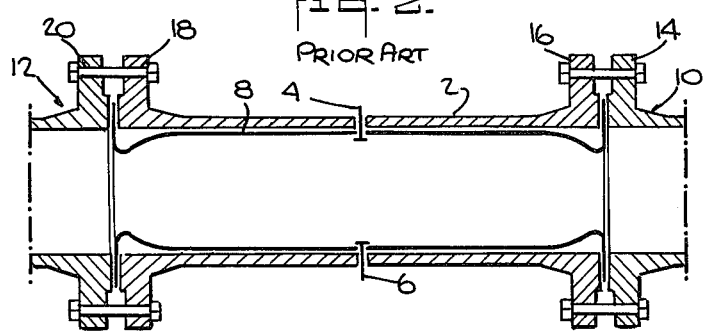
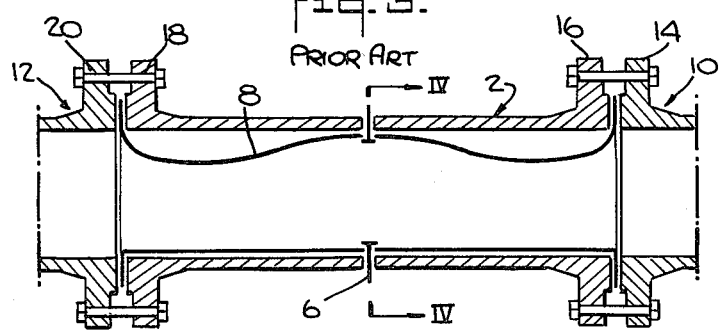
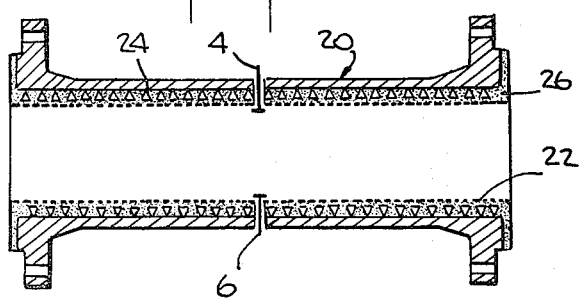
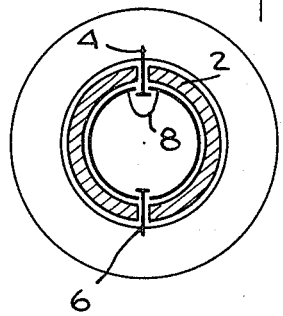

INSULATING LINER FOR ELECTROMAGNETIC FLOWMETER TUBE

BACKGROUND OF INVENTION

The invention relates generally to electromagnetic flowmeters, and more particularly to an improved insulating liner for the flow tube of such meters.

An electromagnetic flowmeter is adapted to measure the flow rates of those fluids which present difficult handling problems, such as corrosive acids, sewage slurries, detergents and the like. In a flowmeter of this type, the liquid whose flow rate is to be measured is conducted through a flow tube provided with a pair of diametrically-opposed electrodes, a magnetic field perpendicular to the longitudinal axis of the tube being established by a pair of oppositely-disposed electromagnets. When the flowing liquid intersects this field, a voltage is induced therein which is transferred to the electrodes. This voltage, which is proportional to the average velocity of the liquid and hence to its average volumetric rate, is then amplified and processed to actuate a recorder or indicator, or to supply an input variable to a process control system.

It is common practice in flowmeters of this type to install an electrically-insulating protective liner on the inside surface of the metal flow tube. This liner may be cemented in place or the entire internal layer may be vulcanized in place, or the liner may consist of a continuous vitreous enameled coating. Often used as insulating liner material is a fluorocarbon material such as PTFE, PFA, FEP or ECTFE. These fluorocarbons, while they have desirable liner properties, are incapable of adhering to the inner surface of the flow tube for prolonged periods.

It is also known to apply an insulating layer to the inside surface of the flowmeter tube by spraying or thermally melting the material thereon. Liners produced by these methods are non-crystalline in structure and have poorly defined electrical insulating properties. Moreover, such liners are readily rendered porous, so that in the course of time the metallic meter tube is caused to corrode.

Another known approach is to install an insulating liner within the flow tube by employing tube-like materials or by pressing in tube-like materials isostatically. In this case, there is no bonding of the tube-like material to the inside surface of the flowmeter tube. If fluorocarbons are used for this purpose, then damage to the liner material may occur as a result of cold flow of these materials when under load by reason of their large thermal expansion coefficients. In particular, due to stresses induced by pressure or vacuum, folds are developed in the liner at points therein where changes in section occur when the temperature is raised. And when operating under vacuum the tubing may possibly collapse.

SUMMARY OF INVENTION

In view of the foregoing, the main object of this invention is to provide a durable and stable insulating liner assembly for an electromagnetic flowmeter tube, the liner assembly and conforming to the inside surface of the meter tube even under difficult stress conditions.

A significant advantage of a liner assembly in accordance with the invention is that it is not subject to tear and its form does not change with time.

Briefly stated, these objects are attained in a liner assembly in which a three-dimensional stiffening structure, preferably having a metallic mesh formation, is embedded in an insulating layer of liner material which conforms to the inside surface of the flowmeter tube. The liner material may be a fluorocarbon whose physical and chemical advantages may be exploited without the disadvantages which normally attend the use of such material as a flowmeter tube liner. The liner material is preferably injection molded into the meter tube after the stiffening structure has been installed therein.

OUTLINE OF DRAWINGS

For a better understanding of the invention as well as other objects and further features thereof, reference is made to the following detailed description to be read in conjunction with the accompanying drawings, wherein:

FIG. 1 is an axial section taken through a flowmeter tube of the prior art type;

FIG. 2 shows the effect of temperature on the FIG. 1 liner;

FIG. 3 shows the effect of vacuum on the FIG. 1 liner;

FIG. 4 is a transverse section taken in the plane indicated by line IV—IV in FIG. 3; and FIG. 5 is an axial section taken through a flowmeter tube which incorporates a liner assembly in accordance with the invention.

DESCRIPTION OF INVENTION

Referring now to FIG. 1, there is illustrated a prior art electromagnetic flowmeter which includes a metallic flow tube 2 having a pair of electrodes 4 and 6 mounted thereon at diametrically-opposed positions whereby when the fluid to be metered intersects a magnetic field whose lines of flux are substantially normal to the flow direction, the voltage induced in the fluid being transferred to these electrodes. The electromagnet which establishes this field is not shown in the drawing. A tubular liner 8 is installed within the tube, the liner having end flanges which overlie the end flanges 16 and 18 of the tube.

In FIG. 2, the meter tube 2 is shown interposed between the downstream and upstream pipe sections 10 and 12 of a fluid line, pipe sections 10 and 12 having end flanges 14 and 20, respectively, which are bolted or otherwise connected to the flow tube flanges 16 and 18. The liner flanges are sandwiched between the pipe sections and the ends of the meter tube. Should stresses due to temperature occur after the meter tube has been installed, liner 8 may become loose in the region of flanges 16 and 18 and fold on itself and eventually break or tear.

FIGS. 3 and 4 show meter flow tube 2 installed in a fashion similar to that shown in FIG. 2, the form of the liner being that produced after it has been in operation under vacuum conditions. As will be seen in these figures, such operation has caused liner 8 to collapse in the upper region of tube 2.

Referring now to FIG. 5, there is shown a flowmeter having a meter tube 20 provided with an electrically-insulating liner assembly in accordance with the invention. The inside surface of the meter tube is covered with a metallic mesh 22. This mesh is attached to the interior wall of the tube at various points, such as point 24. Mesh 22 has injected molded over it a fluorocarbon material 26 to form an insulating liner in which the mesh is embedded, the liner conforming to the inside surface. The three-dimensional mesh, therefore, functions as a stiffening structure for the liner and prevents distortion or collapse thereof under stressful operating conditions.

Attachment of the mesh to the internal wall of the meter pipe is not essential, although it is advantageous. And even if the stiffening structure is unattached, it affords an appreciable improvement over existing insulating liner arrangements.

While there has been shown and described a preferred embodiment of an insulating liner for electromagnetic flowmeter tube in accordance with the invention, it will be appreciated that many changes and modifications may be made therein without, however, departing from the essential spirit thereof.

We claim:

1. An electromagnetic flowmeter comprising:
   A. a metal flow tube provided with a pair of diametrically opposed electrodes whereby when a fluid to be metered is conducted through the tube, it intersects a magnetic field to induce a voltage in the fluid which is transferred to the electrodes; and
   B. a protective liner assembly installed within said meter tube, said assembly being constituted by a three-dimensional stiffening structure embedded within a layer of insulating material which conforms to the inside surface of the flow tube, said stiffening structure being formed by a metal wire mesh bonded at discrete points to the inside surface of said tube, said insulating material being molded about the mesh whereby the liner is inseparable from the tube.

2. A flowmeter as set forth in claim 1, wherein said layer is formed of fluorocarbon material.

3. A flowmeter as set forth in claim 2, wherein said material is injection molded about said stiffening structure.

4. A flowmeter as set forth in claim 1, wherein said tube is provided with mounting flanges and said layer has end flanges which overlie said mounting flanges.

* * * * *